United States Patent
Guirguis

(10) Patent No.: US 7,433,809 B1
(45) Date of Patent: Oct. 7, 2008

(54) SYSTEM AND METHOD FOR NON-LINEAR MODELING

(75) Inventor: Georges H. Guirguis, Cary, NC (US)

(73) Assignee: SAS Institute Inc., Cary, NC (US)

( * ) Notice: Subject to any disclaimer, the term of this patent is extended or adjusted under 35 U.S.C. 154(b) by 174 days.

(21) Appl. No.: 11/339,081

(22) Filed: Jan. 25, 2006

(51) Int. Cl.
*G06F 17/10* (2006.01)

(52) U.S. Cl. ......................................................... 703/2
(58) Field of Classification Search ........................ 703/2
See application file for complete search history.

(56) References Cited

U.S. PATENT DOCUMENTS

| | | | |
|---|---|---|---|
| 7,216,004 B2 * | 5/2007 | Kohn et al. | 700/28 |
| 2002/0183987 A1 * | 12/2002 | Chiang | 703/2 |

\* cited by examiner

*Primary Examiner*—Kamini Shah
*Assistant Examiner*—Herng-der Day
(74) *Attorney, Agent, or Firm*—Jones Day

(57) ABSTRACT

A computer-implemented system and method of non-linear modeling in a computer system having a limited precision processor is provided. A non-linear model is initialized by forming an objective function having one or more functional components and a marginal variance matrix. The model is then iteratively solved using the computer processor until it has converged to a feasible solution. In doing so, the feasibility of computing the objective function is evaluated by determining if the marginal variance matrix is positive definite, thereby indicating whether or not the computer processor is capable of calculating a feasible solution to the non-linear model. If the marginal variance matrix is positive definite, then the objective function and its gradient are computed using the marginal variance matrix. If the marginal variance matrix is not positive definite, then a surrogate marginal variance matrix is constructed that is positive definite and a surrogate objective function is constructed having components continuous first derivatives. The surrogate objective function and its gradient are then computed using the surrogate marginal variance matrix.

22 Claims, 4 Drawing Sheets

SYSTEM AND METHOD FOR NON-LINEAR MODELING

BACKGROUND

1. Technical Field

The technology described in this patent application is generally directed to computer-implemented systems and processes for solving complex optimization problems, and more particularly to optimization problems involving non-linear objective functions.

2. Description of the Related Art

Complex problems are often characterized by a series of functions, each function typically including one or more parameters. In the field of computerized optimization, such problems may be solved by generating a mathematical model of the problem that is referred to as a program. Optimization programs are typically either linear or non-liner programs. Linear programs consist of an objective function and a series of constraint functions, each of which is a linear equation. Such programs are fairly easy to solve. Non-linear programs, however, typically involve complex objective functions comprising several non-linear equations that can be much more difficult to solve and/or optimize. For a more complete discussion of linear and non-linear programs, see "Linear and Nonlinear Programming, Second Edition," by David G. Luenberger, 2005, the entirety of which is incorporated herein by reference.

Non-linear programs or models having a limited-domain objective function can be difficult to solve because the objective function and/or its derivatives may fail at some point in the parameter space being optimized. This failure typically occurs in mixed model objective functions when the marginal variance matrix that describes the mathematical functions of the model parameters is not positive definite, thus resulting in an infeasible solution to the model. In presently known computer-implemented non-linear optimization processes, the model solutions that are iteratively calculated during the optimization process must start at a feasible solution and must remain so during the entire process, otherwise the optimizer will crash or generate an incorrect result. This problem occurs in computer-implemented modeling programs because the computer hardware, more specifically the core processor of the computer, is not capable of handling certain types of calculations due to the limited precision of the computer's processor, or because the computer processor is simply incapable of making certain calculations, such as computing the square root of a negative number.

The objective function of a typical non-linear mixed model may be expressed as follows:

$$-\text{likelihood} = \sum_j \log|V_j| + \sum_j r_j^T V_j^{-1} r_j + \log\left|\sum_j X_j^T V_j^{-1} X_j\right|$$

$$= \sum_j f_1 + \sum_j f_2 + f_3$$

where the variable "-likelihood" is the objective function and $V_j$ is the marginal variance matrix. Here, the mixed model objective function is composed of three functions, $f_1$, $f_2$, and $f_3$, and the residual $r_j$ is given by the following equation:

$$r_j = Y_j - X_j \beta, \text{ with}$$

$$\beta = \left(\sum_j X_j^T X_j\right)^{-1} \sum_j X_j^T Y_j.$$

The marginal variance matrix $V_j$ is typically dependent on the parameters of the model, and thus a possible parameterization of the mixed model can be given by:

$$V(\theta_1, \theta_2) = ZG(\theta_1)Z^T + R(\theta_2),$$

where $\theta_1$, $\theta_2$ are parameters of the optimization problem, and it is desired to either maximize or minimize the likelihood function (i.e., objective function) with respect to the parameters ($\theta_1$, $\theta_2$).

As noted above, the marginal variance matrix ($V_j$) must be a positive definite matrix in order for the model to generate a feasible solution. This condition cannot be ignored in such non-linear mixed models, and is typically represented as a non-linear constraint on the optimization problem when maximizing or minimizing the objective function. Unfortunately, in known non-linear optimizers, this implicit non-linear constraint is rarely enforced because it is difficult to implement. Even though the final solution to the problem may have a positive definite matrix $V_j$, if the initial guess at the solution, as well as any of the iterative guesses made during optimization, yields a non-positive definite matrix for $V_j$, then the optimizer will typically stop operating or generate an incorrect result.

SUMMARY

A computer-implemented system and method of non-linear modeling in a computer system having a limited precision processor is provided. A non-linear model is initialized by forming an objective function having one or more functional components and a marginal variance matrix using a plurality of input parameters to the model stored in a memory coupled to the processor. The non-linear model is then iteratively solved using the computer processor until the model has converged to a feasible solution. In doing so, the feasibility of computing the objective function is evaluated by determining if the marginal variance matrix is positive definite, thereby indicating whether or not the computer processor is capable of calculating a feasible solution to the non-linear model. If the marginal variance matrix is positive definite, then the objective function and its gradient are computed using the marginal variance matrix. If, however, the marginal variance matrix is not positive definite, then a surrogate marginal variance matrix is constructed that is positive definite and a surrogate objective function is constructed in which the one or more functional components of the objective function are replaced with surrogate functional components having continuous first derivatives. The surrogate objective function and its gradient are then computed using the surrogate marginal variance matrix.

DETAILED DESCRIPTION

Figure 1:
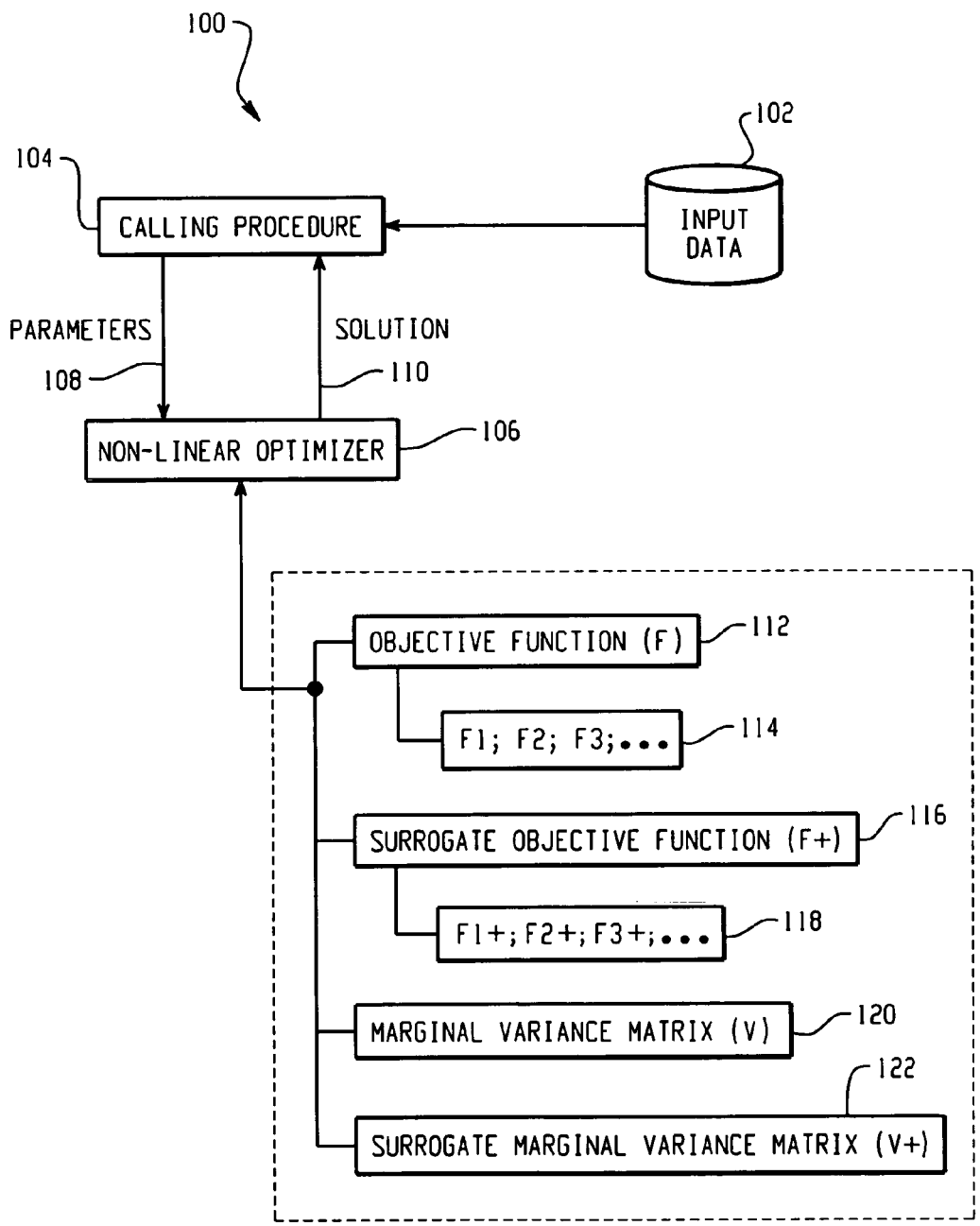
FIG. 1 is a block diagram of an example computer-implemented non-linear modeling system.

FIG. 1 is a block diagram of an example computer-implemented non-linear modeling system 100. The system 100 is typically implemented in a general purpose computer system, such as a mainframe, midrange or even a personal computer, but may also be implemented across a network of computers, within a grid of computers, or in any other suitable implementation that provides sufficient processing power. As described above, such computer systems are characterized by a limited precision in which the computer's processor can not make certain types of calculations. Because of this limited precision, as well as other limitations on the hardware configuration of the processor, such computer systems are prone to crashing, generating an exception fault, or generating incorrect results when attempting to solve a non-linear model having a non-positive definite marginal variance matrix. The system and method described herein, however, modifies the configuration of such a computer processor using specialized software instructions so that the computer processor does not crash or generate an incorrect result when solving such non-linear models.

In this example system 100, a non-linear optimizer 106 is called from a calling procedure 104. The calling procedure 104 may be any type of software-implemented function that requires, as part of its operation, that a solution be provided to a non-linear model. More specifically, the calling procedure 104 may be, for example, a data mining procedure, a risk modeling procedure, a procedure that is performing calculations on economic time series models, or a statistical modeling procedure. Input data store 102 provides model parameters 108 to the calling procedure 104, which are then passed by the calling procedure 104 to the non-linear optimizer 106. The non-linear optimizer 106 attempts to solve a non-linear model based on the calling parameters 108 and returns a solution 110 to the calling procedure.

In order to solve certain non-linear models, and in particular mixed models having limited domain non-linear objective functions, the non-linear optimizer 106 utilizes several functions and matrices 112-122, which are provided to the non-linear optimizer 106 from a data store, over a network, or which may be programmed into the software instructions that embody the optimizer 106. These functions and matrices 112-122 include an objective function (F) 112 that may comprise one or more functional components (F1, F2, F3, ... ) 114; a marginal variance matrix (V) 120 comprising a plurality of eigenvalues that describe the functions of the model parameters; a surrogate objective function (F+) 116 that may also comprise one or more surrogate functional components (F1+, F2+, F3+, ... ) 118; and a surrogate marginal variance matrix (V+) 122.

Unlike prior non-linear optimizers, some of which attempt to manage the infeasibility problem of the marginal variance matrix by imposing an additional non-linear constraint on the objective function, the non-linear optimizer 106 described herein utilizes a special set of software instructions that configure the computer system to use the surrogate objective function (F+) 116 and the surrogate marginal variance matrix (V+) 120 in a manner that allows the computation of the objective function and its gradient to continue in the event that an infeasible solution point is detected.

As described in more detail with reference to FIGS. 2 and 3 below, when the non-linear optimizer 106 detects that an infeasible solution point is about to be computed, it constructs a surrogate objective function (F+) having functional components that have continuous first derivatives (or alternatively that are continuous functions at the solution point) and it also constructs a surrogate marginal variance matrix (V+) in which minimized eigenvalues are substituted in the matrix (V) for eigenvalues that are either negative or very close to zero. These surrogate elements are then used in place of the original elements (F, V) to calculate the current solution point, thus guiding the non-linear optimizer back towards the feasible domain in which the marginal variance matrix (V) is positive definite.

Figure 2:
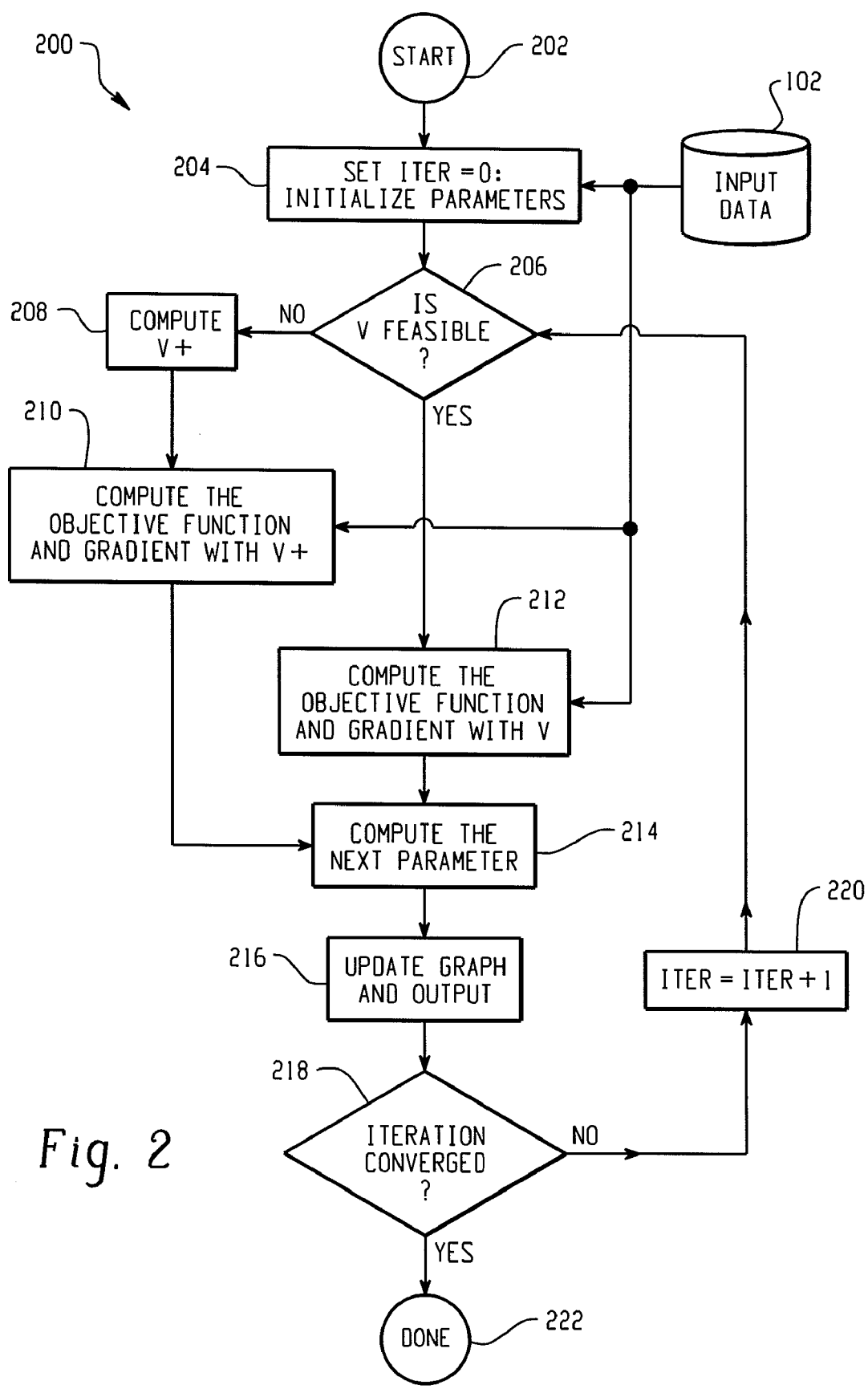
FIG. 2 is a flow diagram of an example computer-implemented method of non-linear modeling.

FIG. 2 is a flow diagram of an example computer-implemented method of non-linear modeling 202. This method 202 is embodied in a set of specialized software instructions that configure the computer system 100 to operate in the manner described in the flow diagram. The method begins at 202. In step 204, the input data store 102 identifies the model parameters to the method so that the original objective function (F) and its marginal variance matrix $V_j$ can be formed. In this step, the model parameters that are used to define the objective function are initialized to starting values. An example mixed model non-linear objective function (F) is set forth below, wherein the variable "-likelihood" is the objective function to be solved.

$$-\text{likelihood} = \sum_j \log|V_j| + \sum_j r_j^T V_j^{-1} r_j + \log\left|\sum_j X_j^T V_j^{-1} X_j\right| = \sum_j f_1 + \sum_j f_2 + f_3$$

Step 204 also initializes the iteration variable, ITER, to zero. Following this initialization step, the method then enters the main solution loop 206-218, in which the non-linear model represented by the objective function (F) and the marginal variance matrix ($V_j$) is iteratively solved until the model has converged to a feasible solution. This main solution loop begins in step 206, in which the computer-implemented method evaluates the feasibility of computing the objective function (F) by determining if the marginal variance matrix ($V_j$) is positive definite.

As discussed above, a non-positive definite marginal variance matrix ($V_j$) is indicative of an infeasible solution point to the objective function (F). Although negative eigenvalues in the marginal variance matrix V is clearly indicative of an infeasible solution point, so too are eigenvalues that are very close to zero. Thus, in evaluating the feasibility of solving the objective function (F) in step 206, the method examines the marginal variance matrix (V) for eigenvalues that are negative or that are very close to zero, such as $10^{-7}$ or $10^{-8}$, but which could also be smaller values depending upon the specific characteristics of the computing apparatus that is operating the method. Although both conditions indicate an infeasible solution point, for purposes of the following description the term positive definite in relation to the marginal variance matrix refers to the condition that the eigenvalues of the matrix are greater than a particular small threshold value $\epsilon$.

If the marginal variance matrix ($V_j$) is positive definite in step 206, then control passes to step 212, in which the original objective function (F) and its gradient are computed using the original marginal variance matrix ($V_j$). The computation of the objective function in this step can be made using numerous known techniques. The next values for the model parameters are then determined at step 214 as a vector of parameters. If the method is being used with a graphical visualization tool that depicts the progress of the iterative convergence, then the solution graph is updated at step 216. At step 218, the non-linear optimizer 106 checks to see if the solution has converged to the point where an acceptable solution has been computed. The acceptable solution point is typically achieved when two successive iterations of the main loop 206-218 result in objective functions that are very close to being identical.

If an acceptable solution is achieved, then the method ends at 222, and the converged solution is provided back to whatever routine or function may have called the non-linear optimization method. If the objective function (F) has not converged to an acceptable solution in step 218, however, then the ITER variable is incremented at step 220 and control passes back to step 206 in which the objective function (F) and its gradient are re-computed using the updated parameter vector from step 214. This iterative process of re-computing the objective function (F) and its gradient continues until the solution has converged in step 218, or until some maximum number of iterations has been surpassed.

If, however, in step 206, the method determines that the marginal variance matrix ($V_j$) is not positive definite, then an infeasible solution point for the objective function has been detected by the system. In this case, system control passes to step 208, in which a surrogate marginal variance matrix (V+) is computed, as further described below in connection with FIG. 3. The surrogate marginal variance matrix (V+) is constructed in a manner such that it is positive definite, thus indicating a feasible solution point to the model. After constructing the surrogate marginal variance matrix (V+), the system then proceeds to construct a surrogate objective function (F+) and its gradient using the surrogate marginal variance matrix. In the case of a mixed model objection function, such as set forth as an example above comprising functional components F1, F2, F3, . . . , the surrogate objective function and its gradient are constructed using surrogate functional components F1+, F2+, F3+, which are components having continuous first derivatives, or alternatively are components that are continuous functions. By replacing the original marginal variance matrix and the objective function components in this manner, and as further described below in connection with FIG. 3, the system is guided away from the infeasible solution space and back towards the feasible space, thus preventing the system and method from ceasing operation or calculating an incorrect result. Control then passes to steps 214-218, as discussed above, and if the solution has not converged then the method iterates back to step 206 to test the feasibility of the next solution point.

Figure 3:
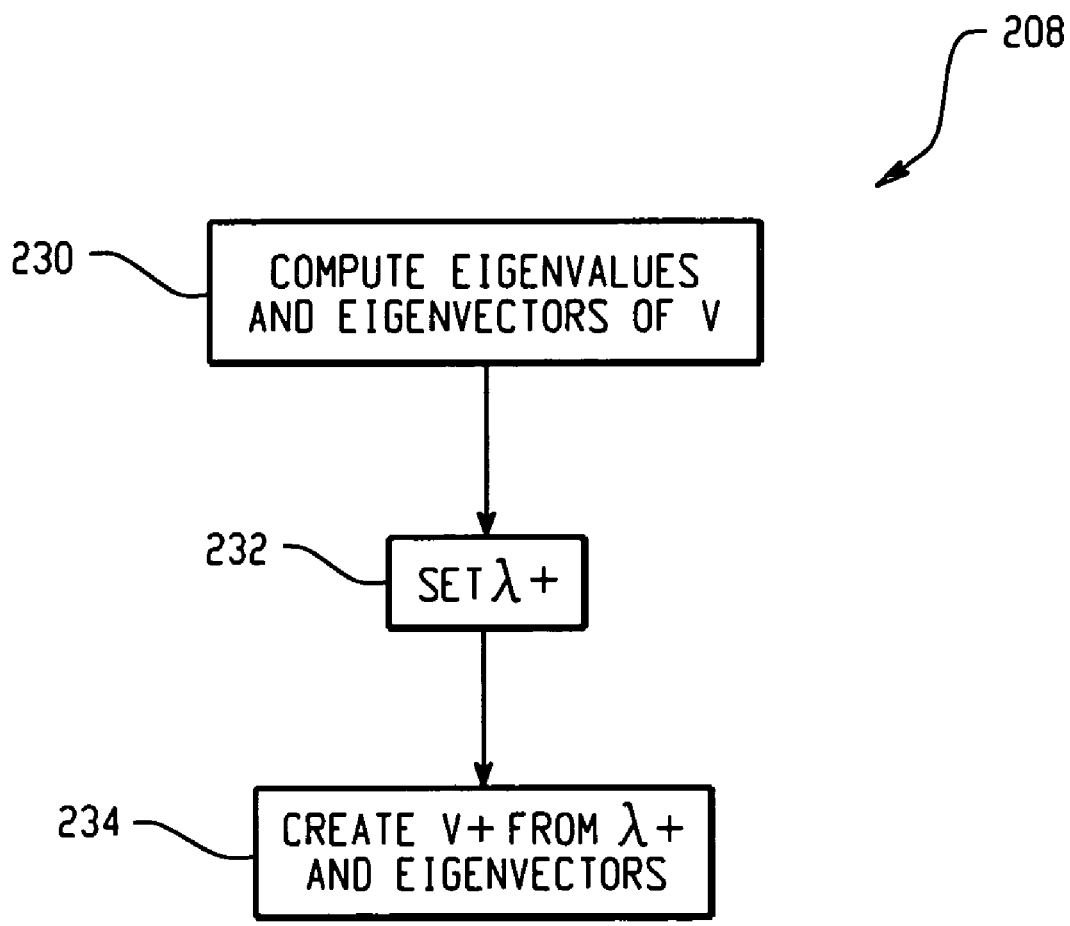
FIG. 3 is a flow diagram of an example computer-implemented method of constructing a surrogate marginal variance matrix.

FIG. 3 is a flow diagram of an example computer-implemented method of constructing a surrogate marginal variance matrix. The steps of this figure correspond to step 208 of FIG. 2, discussed above. Beginning with step 230, the system first computes the eigenvalues and eigenvectors of the marginal variance matrix ($V_j$) by spectral decomposition or by some other decomposition technique. This step, 230, could also be part of step 206 in determining whether V is feasible or not. The output of this step, 230, is a vector of eigenvalues of V, termed herein λ. In step 232, a surrogate vector of eigenvalues (λ+) is then constructed using the following equation:

$$\lambda_i^+ = \max(\lambda_i, \epsilon),$$

where $\epsilon$ is a small positive value ($\epsilon > 0$). The net effect of constructing the surrogate vector λ+ is to eliminate any negative eigenvalues in the marginal variance matrix (V), or any eigenvalues that are less than $\epsilon$, such negative or very small eigenvalues being indicative of an infeasible solution point. Any such eigenvalues will be replaced in the vector by the value of E. Following this step, the surrogate marginal variance matrix (V+) is then constructed in step 234 using the vector λ+.

Having constructed the surrogate marginal variance matrix V+ in this manner, the system is then programmed to compute what is termed a $C^1$ or $C^0$ extension to the objective function, also referred to herein as the surrogate objective function. (Step 210 of FIG. 2) The $C^1$ extension to the objective function substitutes, for each functional component $F_i$ of the objective function F, a function that has continuous first derivatives. An example of such substitution is set forth in the equation below:

$$\Phi_i = \begin{cases} f_i & \text{for } V \text{ positive definite} \\ f_i(\lambda_i^+) + (\nabla f_i(\lambda_i^+))^T(\lambda - \lambda^+) & \text{Otherwise} \end{cases},$$

where $\Phi_i$ represents the functional component of the objective function F, and is set to be the original functional component $F_i$ when the marginal variance matrix is determined to be positive definite in step 206 of FIG. 2, but is set to be the $C^1$ extension of $F_i$ otherwise. Here, the $C^1$ extension function is the first two terms of a Taylor series expansion of $F_i$ in λ, centered at λ+. Other functions having continuous first derivatives could be substituted for the Taylor series. Moreover, instead of a $C^1$ extension to the functional components $F_i$, a $C^0$ extension is also possible as described by the following substitution:

$$\Phi_i = f_i \quad \text{for } V \text{ positive definite;}$$
$$= f_i(\lambda +) + C^T(\lambda - \lambda +) \quad \text{otherwise.}$$

An example of constructing the $C^1$ extension functions is now given herein for the example mixed model objective function described herein above having three functional components F1, F2 and F3. Prior to showing the construction of these functions some background calculations are provided.

Let V(θ) be any symmetric matrix with eigen pair ($\lambda_i(\theta)$, $e_i(\theta)$) with $e_i(\theta)$ being normalized. The eigenvalue problem for V(θ) will then be given by the following equation:

$$V(\theta)e_i(\theta) = \lambda_i(\theta)e_i(\theta).$$

In order to simplify the notation and the equations, the dependence on the θ notation is dropped and the notation "'" is used to denote the differentiation with respect to any $\lambda_i$. From this the following equations follow:

$$Ve_i = \lambda_i e_i$$

$$\lambda_i = e_i^T V e_i$$

$$\frac{\partial \lambda_i}{\partial \vartheta} = e_i^T \frac{\partial V}{\partial \vartheta} e_i$$

$$V = \sum_i \lambda_i e_i e_i^T.$$

In these equations, the vectors $e_i$ are orthonormal, i.e., $$e_i^T e_i = \begin{cases} 0 \text{ for } i \neq j \\ 1 \text{ for } i = j \end{cases}$$

From these equations, the differentiation of the marginal variance matrix is then given by the following equation:

$$V' = \frac{\partial V}{\partial \lambda_i} = e_i e_i^T,$$

and the surrogate marginal variance matrix, V+, is given by:

$$V^+ = \sum_i \lambda_i^+ e_i e_i^T.$$

With this background analysis in place, in the following description shows the creation of the $C_1$ extensions to the objective function (F) for the different functional components (F1, F2 and F3) of the example objective function set forth above. These extension functions are utilized in step 210 of FIG. 2 whenever the computer system determines that the marginal variance matrix (V) is not positive definite. In the following computations, the focus is on obtaining derivatives with respect to $\lambda_i$, and then by using the "chain rule," the derivatives with respect to any parameter θ may be obtained, as follows:

$$\frac{\partial f}{\partial \theta} = \sum_i \frac{\partial f}{\partial \lambda_i} \frac{\partial \lambda_i}{\partial \theta}.$$

Beginning then with the construction of the C1 extension of the first functional component, F1, $$f_1 = \log|V| = \sum_k \log \lambda_k$$

the following result is obtained:

$$(\nabla f_1)_k = \frac{\partial f_1}{\partial \lambda_k} = \frac{1}{\lambda_k}.$$

Turning then to the second functional component, F2, given that $$r_j = y_j - X_j \left( \sum_i X_i^T X_i \right)^{-1} \sum_i X_i^T Y_i,$$

$$f_2 = r_j^T V^{-1} r_j = r_j^T \left( \sum_k \frac{e_k e_k^T}{\lambda_k} \right) r_j,$$

and therefore $$(\nabla f_2)_k = \frac{\partial f_2}{\partial \lambda_k} = \sum_k \frac{\|r_j^T e_k\|^2}{\lambda_k}.$$

Finally, with respect to the third functional component of the example mixed model objective function, F3, let $$S = \sum_i (X_i^T V^{-1} X_i).$$

and let ($\mu_1$, $\eta_i$) be the eigen pairs (values and vectors) of the matrix S, then $$S\eta_1 = \mu_1 \eta_1$$

$$f_3 = \log|S| = \sum_i \log \mu_i,$$

and thus the gradient of F3 will be given by:

$$(\nabla f_3)_k = \frac{\partial f_3}{\partial \lambda_k} = \sum_i \frac{\mu_i'}{\mu_i}.$$

Figure 4:
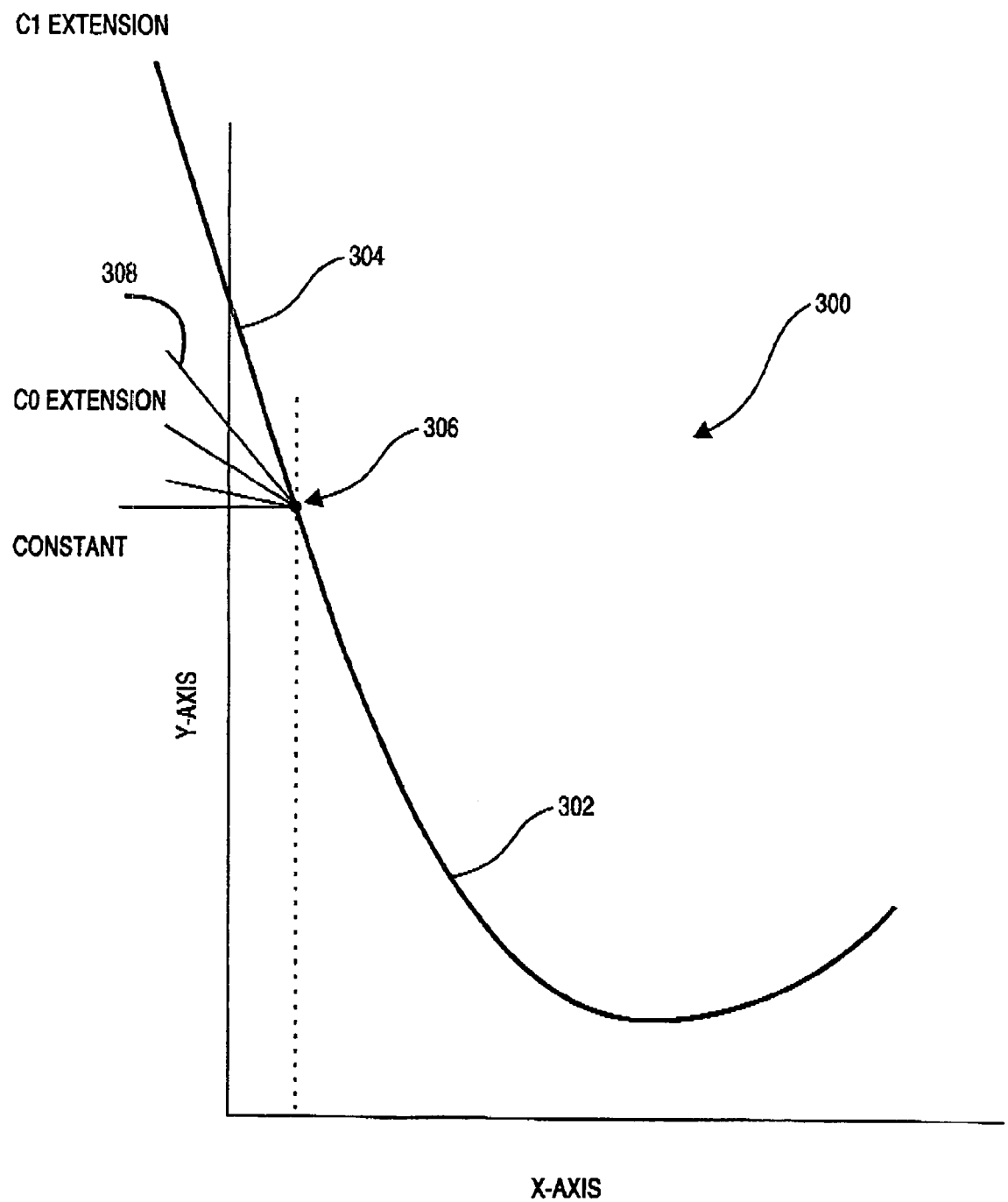
FIG. 4 is an example plot showing the effect of using the system and method of FIGS. 1-3.

FIG. 4 is an example plot 300 showing the effect of using the system and method of FIGS. 1-3. This plot 300 shows a one-dimensional view 302 of the convergence of one eigenvalue of the objective function to a solution point. As shown in this plot, as the solution for this eigenvalue nears the point 306, which in the x-axis dimension is the value ϵ, the system and method determine that the solution is approaching a potentially infeasible solution and instead of continuing to calculate the original objective function (F), the system and method substitute either the $C_1$ extension functions 304 or the $C_0$ extension functions 308 so that the algorithm can continue to iterate to a solution in the feasible solution space.

While certain examples have been used to disclose and illustrate one or more embodiments of the invention, including the best mode, and also to enable any person skilled in the art to make and use the invention, the patentable scope of the invention is defined by the claims, and may include other examples that occur to those skilled in the art.

It is further noted that the systems and methods disclosed herein may be implemented on various types of computer architectures, such as for example on a single general purpose computer or workstation, or on a network (e.g., local area network, wide area network, or internet), or in a client-server configuration, or in an application service provider configuration. Also, the system's and method's data (such as hierarchical dimensional data) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

The invention claimed is:

1. A computer-implemented non-linear optimizer for use with a limited precision computer processor executing a calling procedure that generates a plurality of model parameters and requests a solution to a non-linear model from the non-linear optimizer, comprising:

means for initializing a non-linear model by forming an objective function (F) having functional components (F1, F2, . . . ) and a marginal variance matrix (V) using a plurality of input parameters to the model stored in a memory coupled to the processor;

means for iteratively solving the non-linear model using the computer processor until the model has converged to a feasible solution, comprising:

means for evaluating the feasibility of computing the objective function by determining if the marginal variance matrix (V) is positive definite, thereby indicating whether the limited precision processor is capable of calculating a feasible solution to the objective function;

means, responsive to the marginal variance matrix (V) being positive definite, for executing a first set of computer software instructions using the limited precision computer processor that calculate the objective function (F) and its gradient using the marginal variance matrix (V); and means, responsive to the marginal variance matrix (V) not being positive definite, for executing a second set of computer software instructions using the limited precision computer processor that:

(a) construct a surrogate marginal variance matrix (V+) that is positive definite;

(b) construct a surrogate objective function (F+) in which the functional components (F1, F2, . . . ) of the objective function are replaced with surrogate functional components (F1+, F2+, . . . ) having continuous first derivatives; and (c) calculate the surrogate objective function (F+) and its gradient using the surrogate marginal variance matrix (V+);

wherein the limited precision computer processor is able to continue iteratively solving the non-linear model without crashing or returning an incorrect result even though the marginal variance matrix (V) for a given iteration is not positive definite, and wherein the objective function (F) is described by the following equation:

$$-\text{likelihood} = \sum_j \log|V_j| + \sum_j r_j^T V_j^{-1} r_j + \log\left|\sum_j X_j^T V_j^{-1} X_j\right|$$

$$= \sum_j f_1 + \sum_j f_2 + f_3$$

, wherein the variable "-likelihood" is the objective function, $V_j$ is the marginal variance matrix, and $r_j$ is the residual value.

2. The non-linear optimizer of claim 1, wherein the marginal variance matrix (V) comprises a plurality of eigenvalues based on the input parameters to the model, and wherein the means for evaluating determines whether any of the eigenvalues in the marginal variance matrix (V) are less than zero.

3. The non-linear optimizer of claim 1, wherein the marginal variance matrix (V) comprises a plurality of eigenvalues based on the input parameters to the model, and wherein the means for evaluating determines whether any of the eigenvalues in the marginal variance matrix (V) are less than a threshold positive value.

4. The non-linear optimizer of claim 1, further comprising:

means for outputting the calculations of the objective function (F) and the surrogate objective function (F+) to a graphical display device coupled to the computer processor.

5. The non-linear optimizer of claim 1, wherein the surrogate marginal variance matrix is constructed by substituting a threshold positive value for any eigenvalue in the marginal variance matrix that is less than zero.

6. The non-linear optimizer of claim 1, wherein the surrogate marginal variance matrix is constructed by substituting a threshold positive value for any eigenvalue in the marginal variance matrix that is less than the threshold positive value.

7. The non-linear optimizer of claim 1, wherein the surrogate functional components are continuous functions.

8. The non-linear optimizer of claim 1, wherein the functional components (F1, F2, . . . ) and the surrogate functional components (F1+, F2+, . . . ) are defined by the following equation:

$$\Phi_i = \begin{cases} f_i & \text{for } V \text{ positive definite} \\ f_i(\lambda_i^+) + (\nabla f_i(\lambda_i^+))^T(\lambda - \lambda^+) & \text{Otherwise} \end{cases},$$

wherein $\Phi i$ represents the functional component (F1, F2, . . . ) or the surrogate functional component (F1+, F2+, . . . ), and according to this equation is set to be the original functional component $F_i$ when the marginal variance matrix V is positive definite, and otherwise is set to be the first two terms of a Taylor series expansion in $F_i$ in $\lambda$ centered at $\lambda$+, wherein $\lambda$ is a vector of eigenvalues of V, and $\lambda$+ is a surrogate vector of eigenvalues.

9. The non-linear optimizer of claim 8, wherein the surrogate vector of eigenvalues $\lambda$+ is constructed using the following equation:

$\lambda_i^+ = \max(\lambda_i, \epsilon)$, where $\epsilon$ is a small positive value.

10. The non-linear optimizer of claim 1, wherein the functional components (F1, F2, . . . ) and the surrogate functional components (F1+, F2+, . . . ) are defined by the following equation:

$$\Phi_i = f_i \quad \text{for } V \text{ positive definite;}$$
$$= f_i(\lambda+) + C^T(\lambda - \lambda) \quad \text{otherwise}$$

wherein Φi represents the functional component (F1, F2, . . . ) or the surrogate functional component (F1+, F2+, . . . ), and according to this equation is set to be the original functional component $F_i$ when the marginal variance matrix V is positive definite, and otherwise is set to be the first two terms of a series expansion in Fi in λ centered at λ+, wherein λ is a vector of eigenvalues of V, and λ+ is a surrogate vector of eigenvalues.

11. The non-linear optimize of claim 1, wherein the calling procedure is a data mining procedure, a risk modeling procedure, a time series modeling procedure or a statistical modeling procedure.

12. A computer-implemented method of non-linear modeling in a computer system having a limited precision processor, comprising:

initializing a non-linear model by forming an objective function (F) having functional components (F1, F2, . . . ) and a marginal variance matrix (V) using a plurality of input parameters to the model stored in a memory coupled to the processor;

iteratively solving the non-linear model using the computer processor until the model has converged to a feasible solution, comprising the steps of:

evaluating the feasibility of computing the objective function by determining if the marginal variance matrix (V) is positive definite, thereby indicating whether the limited precision processor is capable of calculating a feasible solution to the objective function;

if the marginal variance matrix (V) is positive definite, then executing a first set of computer software instructions using the limited precision computer processor that calculate the objective function (F) and its gradient using the marginal variance matrix (V); and if the marginal variance matrix (V) is not positive definite, then executing a second set of computer software instructions using the limited precision computer processor that:

(a) construct a surrogate marginal variance matrix (V+) that is positive definite;

(b) construct a surrogate objective function (F+) in which the functional components (F1, F2, . . . ) of the objective function are replaced with surrogate functional components (F1+, F2+, . . . ) having continuous first derivatives; and (c) calculate the surrogate objective function (F+) and its gradient using the surrogate marginal variance matrix (V+);

wherein the limited precision computer processor is able to continue iteratively solving the non-linear model without crashing or returning an incorrect result even though the marginal variance matrix (V) for a given iteration is not positive definite, and wherein the objective function (F) is described by the following equation:

$$-\text{likelihood} = \sum_j \log|V_j| + \sum_j r_j^T V_j^{-1} r_j + \log\left|\sum_j X_j^T V_j^{-1} X_j\right|$$

-continued
$$= \sum_j f_1 + \sum_j f_2 + f_3$$

, wherein the variable "-likelihood" is the objective function $V_j$ is the marginal variance matrix, and $r_j$ is the residual value.

13. The method of claim 12, wherein the marginal variance matrix (V) comprises a plurality of eigenvalues based on the input parameters to the model, and wherein the evaluating step determines whether any of the eigenvalues in the marginal variance matrix (V) are less than zero.

14. The method of claim 12, wherein the marginal variance matrix (V) comprises a plurality of eigenvalues based on the input parameters to the model, and wherein the evaluating step determines whether any of the eigenvalues in the marginal variance matrix (V) are less than a threshold positive value.

15. The method of claim 14, wherein the threshold positive value is about $10^{-7}$.

16. The method of claim 12, further comprising:

during the iteratively solving step, outputting the calculations of the objective function (F) and the surrogate objective function (F+) to a graphical display device coupled to the computer processor.

17. The method of claim 12, wherein the surrogate marginal variance matrix is constructed by substituting a threshold positive value for any eigenvalue in the marginal variance matrix that is less than zero.

18. The method of claim 12, wherein the surrogate marginal variance matrix is constructed by substituting a threshold positive value for any eigenvalue in the marginal variance matrix that is less than the threshold positive value.

19. The method of claim 12, wherein the surrogate functional components are continuous functions.

20. The method of claim 12, wherein the functional components (F1, F2, . . . ) and the surrogate functional components (F1+, F2+, . . . ) are defined by the following equation:

$$\Phi_i = \begin{cases} f_i & \text{for } V \text{ positive definite} \\ f_i(\lambda_i^+) + (\nabla f_i(\lambda_i^+))^T(\lambda - \lambda^+) & \text{Otherwise} \end{cases},$$

wherein Φi represents the functional component (F1, F2, . . . ) or the surrogate functional component (F1+, F2+, . . . ), and according to this equation is set to be the original functional component $F_i$ when the marginal variance matrix V is positive definite, and otherwise is set to be the first two terms of a Taylor series expansion in $F_i$ in λ centered at λ+, wherein λ is a vector of eigenvalues of V, and λ+ is a surrogate vector of eigenvalues.

21. The method of claim 20, wherein the surrogate vector of eigenvalues λ+ is constructed using the following equation:

$\lambda_i^+ = \max(\lambda_i, \epsilon)$, where $\epsilon$ is a small positive value.

22. The method of claim 12, wherein the functional components (F1, F2, . . . ) and the surrogate functional components (F1+, F2+, . . . ) are defined by the following equation:

$$\Phi_i = f_i \quad \text{for } V \text{ positive definite;}$$

-continued $$= f_i(\lambda+) + C^T(\lambda - \lambda+) \quad \text{otherwise}$$

wherein $\phi i$ represents the functional component (F1, F2, ... ) or the surrogate functional component (F1+, F2+, ... ), and according to this equation is set to be the original functional component $F_i$ when the marginal variance matrix V is positive definite, and otherwise is set to be the first two terms of a series expansion in Fi in $\lambda$ centered at $\lambda+$, wherein $\lambda$ is a vector of eigenvalues of V, and $\lambda+$ is a surrogate vector of eigenvalues.

\* \* \* \* \*

UNITED STATES PATENT AND TRADEMARK OFFICE
CERTIFICATE OF CORRECTION

PATENT NO. : 7,433,809 B1
APPLICATION NO. : 11/339081
DATED : October 7, 2008
INVENTOR(S) : Guirguis It is certified that error appears in the above-identified patent and that said Letters Patent is hereby corrected as shown below:

Column 11, line 5, change "= fi($\lambda$+) + CT($\lambda - \lambda$)" to -- = fi($\lambda$+) + CT($\lambda - \lambda$+) --.

Column 11, line 15, change "optimize" to -- optimizer --.

Column 12, line 8, insert a comma after the word "tion".

Signed and Sealed this

Ninth Day of December, 2008

JON W. DUDAS
*Director of the United States Patent and Trademark Office*